(12) United States Patent
Cho et al.

(10) Patent No.: US 9,443,536 B2
(45) Date of Patent: Sep. 13, 2016

(54) APPARATUS AND METHOD FOR DETECTING VOICE BASED ON MOTION INFORMATION

(75) Inventors: Jeong-Mi Cho, Suwon-si (KR); Jeong-Su Kim, Yongin-si (KR); Won-Chul Bang, Seongnam-si (KR); Nam-Hoon Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 12/770,086

(22) Filed: Apr. 29, 2010

(65) Prior Publication Data

US 2010/0277579 A1   Nov. 4, 2010

(30) Foreign Application Priority Data

Apr. 30, 2009   (KR) .................. 10-2009-0038267

(51) Int. Cl.
| H04N 7/14 | (2006.01) |
| G10L 25/78 | (2013.01) |
| G06F 3/01 | (2006.01) |
| G06F 3/0346 | (2013.01) |
| G06K 9/00 | (2006.01) |
| G10L 15/24 | (2013.01) |
| G06K 9/32 | (2006.01) |

(52) U.S. Cl.
CPC .............. G10L 25/78 (2013.01); G06F 3/017 (2013.01); G06F 3/0346 (2013.01); G06K 9/00335 (2013.01); G10L 15/24 (2013.01); G06K 2009/3225 (2013.01)

(58) Field of Classification Search
None
See application file for complete search history.

(56) References Cited

U.S. PATENT DOCUMENTS

| 5,884,257 | A | * | 3/1999 | Maekawa et al. ............ 704/248 |
| 6,073,033 | A | * | 6/2000 | Campo ........................ 455/566 |
| 6,076,061 | A | * | 6/2000 | Kawasaki et al. ............ 704/270 |
| 6,420,975 | B1 | * | 7/2002 | DeLine et al. ............. 340/815.4 |
| 6,532,447 | B1 | * | 3/2003 | Christensson ................ 704/275 |
| 6,686,844 | B2 | * | 2/2004 | Watanabe et al. ......... 340/573.1 |
| 6,754,373 | B1 | * | 6/2004 | de Cuetos et al. ........... 382/118 |
| 6,836,651 | B2 | * | 12/2004 | Segal et al. .................. 455/405 |
| 6,894,714 | B2 | * | 5/2005 | Gutta et al. ................ 348/14.07 |

(Continued)

FOREIGN PATENT DOCUMENTS

| JP | 08-234789 | 9/1996 |
| JP | 10-301675 A | 11/1998 |

(Continued)

OTHER PUBLICATIONS

Almajai et al., "Using Audio-Visual Features for Robust Voice Activity Detection in Clean and Noisy Speech," *In Proceedings of the 16th European Signal Processing Conference (EUSIPCO 2008)*, Aug. 25-29, 2008, Lausanne, Switzerland, pp. 1-5.

(Continued)

*Primary Examiner* — Greg C Bengzon
(74) *Attorney, Agent, or Firm* — NSIP Law

(57) ABSTRACT

Disclosed are an apparatus and method of deducing a user's intention using motion information. The user's intention deduction apparatus includes a speech intention determining unit configured to predict a speech intention regarding a user's speech using motion information sensed by at least one motion capture sensor, and a controller configured to control operation of detecting a voice section from a received sound signal based on the predicted speech intention.

19 Claims, 7 Drawing Sheets

(56) References Cited

U.S. PATENT DOCUMENTS

| | | | |
|---|---|---|---|
| 6,930,608 B2* | 8/2005 | Grajales et al. | 340/573.5 |
| 7,110,801 B2* | 9/2006 | Nassimi | 455/575.2 |
| 7,171,357 B2 | 1/2007 | Boland | |
| 7,203,643 B2 | 4/2007 | Garudadri | |
| 7,230,955 B1 | 6/2007 | James et al. | |
| 7,251,197 B2* | 7/2007 | Yoshida et al. | 368/10 |
| 7,301,526 B2* | 11/2007 | Marvit et al. | 345/156 |
| 7,302,388 B2 | 11/2007 | Zhang et al. | |
| 7,318,030 B2* | 1/2008 | Guduru | 704/243 |
| 7,343,289 B2 | 3/2008 | Cutler et al. | |
| 7,346,502 B2 | 3/2008 | Gao et al. | |
| 7,346,504 B2 | 3/2008 | Liu et al. | |
| 7,383,181 B2 | 6/2008 | Huang et al. | |
| 7,512,245 B2* | 3/2009 | Rasmussen et al. | 381/110 |
| 7,536,020 B2* | 5/2009 | Fukumoto et al. | 381/151 |
| 7,657,252 B2* | 2/2010 | Futami | 455/412.1 |
| 7,957,762 B2* | 6/2011 | Herz et al. | 455/550.1 |
| 8,189,429 B2* | 5/2012 | Chen et al. | 367/118 |
| 8,325,214 B2* | 12/2012 | Hildreth | 348/14.03 |
| 2001/0005687 A1* | 6/2001 | Ushida | H04M 1/271 455/575.1 |
| 2002/0181773 A1* | 12/2002 | Higaki et al. | 382/190 |
| 2003/0018475 A1* | 1/2003 | Basu | G06K 9/00228 704/270 |
| 2003/0120183 A1* | 6/2003 | Simmons | 600/595 |
| 2004/0092297 A1* | 5/2004 | Huang | G06F 1/1616 455/575.7 |
| 2004/0193413 A1* | 9/2004 | Wilson et al. | 704/243 |
| 2005/0043954 A1* | 2/2005 | Roth et al. | 704/275 |
| 2005/0228673 A1 | 10/2005 | Nefian et al. | |
| 2005/0267745 A1 | 12/2005 | Laaksonen et al. | |
| 2006/0053007 A1 | 3/2006 | Niemisto | |
| 2006/0192775 A1* | 8/2006 | Nicholson et al. | 345/211 |
| 2006/0253283 A1 | 11/2006 | Jabloun | |
| 2007/0075965 A1* | 4/2007 | Huppi | H04M 1/72563 345/156 |
| 2007/0129098 A1* | 6/2007 | Cheng et al. | 455/550.1 |
| 2007/0136071 A1 | 6/2007 | Lee et al. | |
| 2007/0182595 A1* | 8/2007 | Ghasabian | 341/22 |
| 2007/0218958 A1* | 9/2007 | Emery et al. | 455/569.1 |
| 2008/0040109 A1 | 2/2008 | Muralidhar et al. | |
| 2008/0228496 A1* | 9/2008 | Yu et al. | 704/275 |
| 2008/0252595 A1* | 10/2008 | Boillot | 345/156 |
| 2008/0255842 A1 | 10/2008 | Simhi | |
| 2009/0015425 A1* | 1/2009 | Palmqvist | H04M 1/0245 340/686.6 |
| 2009/0105785 A1* | 4/2009 | Wei et al. | 607/48 |
| 2009/0111507 A1* | 4/2009 | Chen | 455/550.1 |
| 2009/0129620 A1* | 5/2009 | Tagawa | H04R 3/005 381/364 |
| 2009/0150160 A1* | 6/2009 | Mozer | 704/275 |
| 2009/0176540 A1* | 7/2009 | Do et al. | 455/575.2 |
| 2009/0265671 A1* | 10/2009 | Sachs et al. | 715/863 |
| 2010/0105435 A1* | 4/2010 | Ueda et al. | 455/563 |
| 2010/0125816 A1* | 5/2010 | Bezos | 715/863 |
| 2011/0181422 A1* | 7/2011 | Tran | 340/573.1 |
| 2011/0218696 A1* | 9/2011 | Okada et al. | 701/1 |
| 2012/0151421 A1* | 6/2012 | Clarkson | 715/863 |
| 2012/0188158 A1* | 7/2012 | Tan et al. | 345/156 |

FOREIGN PATENT DOCUMENTS

| | | |
|---|---|---|
| JP | 2000-276190 | 10/2000 |
| JP | 2001-100878 | 4/2001 |
| KR | 10-2002-0068235 | 8/2002 |
| KR | 10-2007-0004017 | 1/2007 |
| KR | 10-2007-0061207 | 6/2007 |

OTHER PUBLICATIONS

Libal et al., "An Embedded System for In-Vehicle Visual Speech Activity Detection," *In Proceedings of the IEEE 9th Workshop on Multimedia Signal Processing*, Oct. 1-3, 2007, pp. 255-258.

Sodoyer et al., "An Analysis of Visual Speech Information Applied to Voice Activity Detection," *In Proceedings of the 2006 IEEE International Conference on Acoustics, Speech and Signal Processing (ICASSP 2006)*, May 14-19, 2006, vol. 1, pp. 1-4.

Korean Office Action mailed Mar. 19, 2015 in counterpart Korean Application No. 10-2009-0038267 (9 pages, in Korean, with complete English translation).

* cited by examiner

APPARATUS AND METHOD FOR DETECTING VOICE BASED ON MOTION INFORMATION

CROSS-REFERENCE TO RELATED APPLICATION

This application claims the benefit under 35 U.S.C. §119 (a) of Korean Patent Applications No. 10-2009-0038267, filed on Apr. 30, 2009, the disclosure of which is incorporated by reference in its entirety for all purposes.

BACKGROUND

1. Field

The following description also relates to a sound detection technology, and more particularly, to an apparatus and method for efficiently detecting sound.

2. Description of the Related Art

Voice activity detection (VAD) or sound source detection is essential in signal processing and greatly influences the whole system performance. VAD may improve system performance in various applications, such as voice encoding, multimedia communication, speech enhancement in noisy environments and voice recognition, etc. The VAD checks presence of voice signal every analysis interval. That is, whether or not voice is made every analysis interval may be informed. A conventional VAD method uses values related to the frequency spectrum magnitudes of input signals, such as energy of voice signals, Zero Crossing Rate (ZCR), Level Crossing Rate (LCR), Signal to Noise (SNR), statistical distribution of frequency components, etc.

SUMMARY

In one general aspect, there is provided a voice detection apparatus which senses and analyzes a user's motion information to predict the user's speech intention, and performs a voice detection operation according to the predicted user's speech intention. The voice detection apparatus calculates motions or locations of the user's body parts on which no motion sensor is attached based on motion information sensed by a motion sensor, and predicts the user's speech intention using the results of the calculation. The user's speech intention may be classified into a speech input intention and a speech termination intention.

The voice detection apparatus secondarily predicts or verifies the user's speech intention predicted using the motion information by receiving information indicating whether voice is being input from the controller. For example, if the predicted speech intention is to speak and no voice is being input, the voice detection apparatus determines that the secondarily predicted speech intention is to speak, and if the predicted speech intention is to terminate speech and voice is being input, determines that the secondarily predicted speech intention is to terminate speech. Otherwise, the voice detection apparatus decides the predicted speech intention as being an operation not associated with a voice input, ignoring the predicted speech intention.

If the predicted speech intention is to speak, the voice detection apparatus analyzes a received voice signal to detect a voice section from the voice, and recognizes speech of the voice section. Then, a corresponding application operates according to the result of the voice recognition and the result of the operation is provided to the user. When detecting the voice section, the voice detection apparatus may use multimodal information which can be sensed when the user speaks, as well as the voice signal. The sensed information may include at least one piece of image information, temperature information and vibration information.

In another general aspect, there is provided a voice detection method which predicts a user's speech intention using sensed motion information and controls an operation of detecting a voice section based on the predicted speech intention.

Other objects, features and advantages will be apparent from the following description, the drawings, and the claims.

BRIEF DESCRIPTION OF THE DRAWINGS

Elements, features, and structures are denoted by the same reference numerals throughout the drawings and the detailed description, and the size and proportions of some elements may be exaggerated in the drawings for clarity, illustration, and convenience.

DETAILED DESCRIPTION

The detailed description is provided to assist the reader in gaining a comprehensive understanding of the methods, apparatuses and/or systems described herein. Various changes, modifications, and equivalents of the systems, apparatuses, and/or methods described herein will likely suggest themselves to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions are omitted to increase clarity and conciseness.

Figure 1:
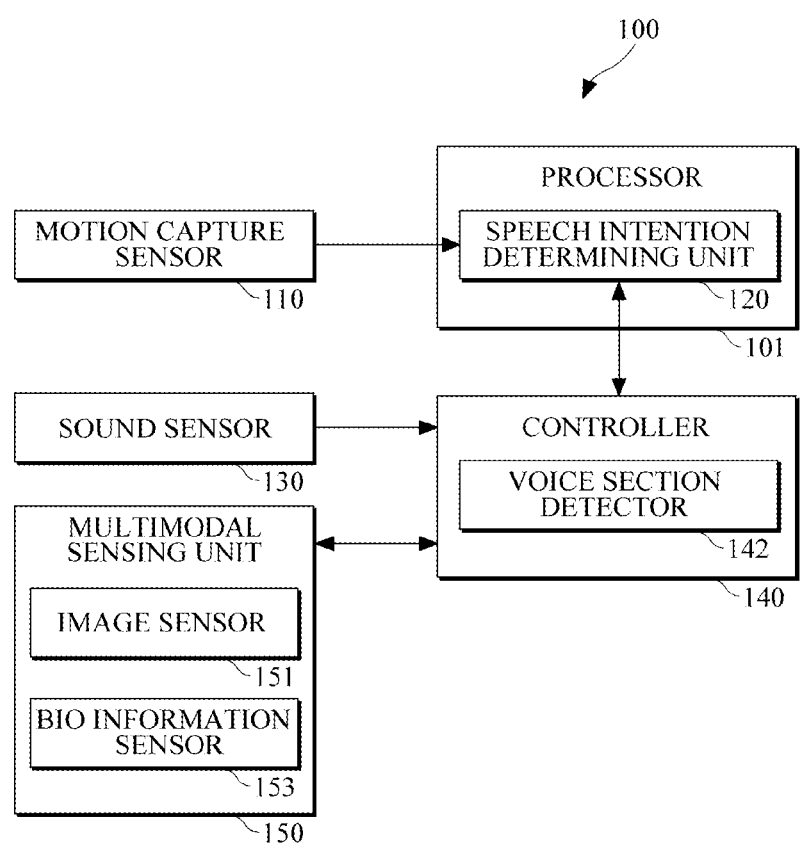
FIG. 1 is a diagram illustrating an example of a voice detection apparatus using motion information.

FIG. 1 is a diagram illustrating an example of a voice detection apparatus 100 using motion information.

Referring to FIG. 1, the voice detection apparatus 100 may include a motion capture sensor 110, a speech intention determining unit 120, a sound sensor 130, a controller 140, and a multimodal sensor 150. The voice detection apparatus 100 may be implemented as an arbitrary device or system, such as such as a personal computer (PC), a server computer, a mobile terminal, a set-top box, cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like etc. Also, the voice detection apparatus 100 may further include various components, such as a user interface, a display, a sound output unit, a multimodal interface, and so on. This is a non-exhaustive, nonlimiting list.

The motion capture sensor 110 may include an inertia sensor for sensing motion, a terrestrial magnetism sensor for sensing a direction, and an acceleration sensor or a gyro sensor for sensing movement. According to an example embodiment, a plurality of motion capture sensors are attached on a user's body parts to sense motion of the user.

The speech intention determining unit 120 may predict the user's motion using the motion information, and predict a speech intention regarding speech using the predicted user's motion. The detailed configuration and operation of the speech intention determining unit 120 will be described with reference to FIGS. 2 and 3, later.

The controller 140 may include applications, data and an OS system to control the operations of the respective components of the voice detection apparatus 100. Also, the controller 140 may include a voice section detector 142 which detects a voice section using the predicted speech intention.

The controller 140 may convert a sound signal received from the sound sensor 130 into a digital sound signal, and then frame the digital signal. However, this process may be performed by the sound sensor 130. A unit of a frame may depend on a sampling frequency, an application type, etc. The controller 140 may detect a voice section by extracting and classifying characteristics of the digital sound frame using one of various known characteristic extraction algorithms. The controller 140 may detect a voice section, using image information or bio information received respectively from the image sensor 151 and bio information sensor 153 included in the multimodal sensor 150, as well as a sound signal.

Figure 2:
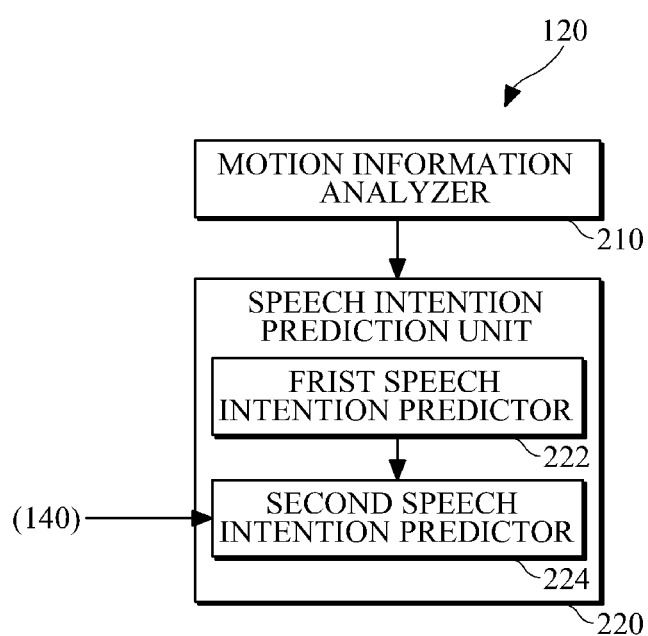
FIG. 2 is diagram illustrating an example of a speech intention determiner illustrated in FIG. 1.

FIG. 2 shows a configuration of the speech intention determining unit 120 of FIG. 1.

The speech intention determining unit 120 may include a motion information analyzer 210 and a speech intention prediction unit 220.

Figure 7:
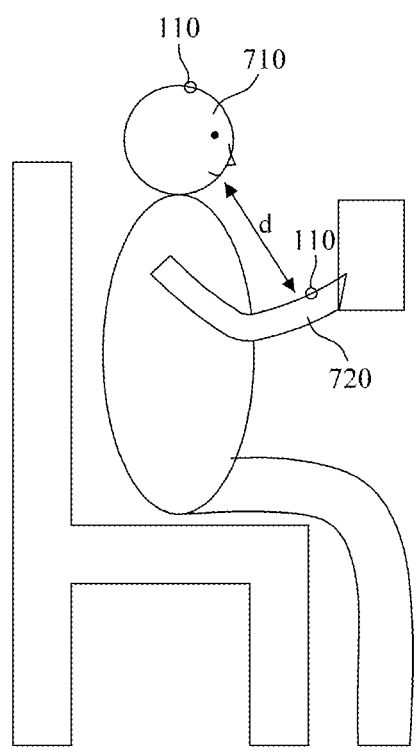
FIG. 7 is a diagram illustrating examples of locations of sensors of a voice detection apparatus.

The motion information analyzer 210 may predict information about the locations and angles of a user's body parts on which motion capture sensors are attached by analyzing motion information, and predict body location and angle information about the user's body parts on which no motion capture sensor is attached using the predicted location and angle information. For example, it is presumed that the motion capture sensors 110 (see FIG. 1) are attached on a user's both wrists 720 and head 710 (see FIG. 7), distances between the motion capture sensors are measured, and each sensor can acquire information about a 3-dimensional rotation angle with respect to a reference coordinate system. Accordingly, by calculating information about the distances between the wrist parts and head part and the rotation angles of the wrists using motion information, distances between the wrists and mouth can also be calculated. If a user holds a microphone corresponding to the sound sensor 130 of the sound detection apparatus 100, a distance between the microphone and mouth and a direction of the microphone may be calculated.

As another example, if the motion capture sensors 110 are attached on a user's head and a microphone corresponding to a sound sensor, by measuring a distance between the microphone and head using motion information and acquiring information about a 3-dimensional angle of an axis on which an inertia sensor is placed from the inertia sensor attached on the microphone, information about distances between the wrists and mouth and a rotation angle of the microphone may be calculated.

The speech intention prediction unit 220 may determine whether the user's speech intention is to speak or to terminate speech using the sensed motion information. The speech intention prediction unit 220 may include a first speech intention predictor 222 and a second speech intention predictor 224. The first speech intention predictor 222 may predict a user's speech intention using the sensed motion information, and the second speech intention predictor 224 may further receive information on whether voice is being input and sound is detected, from the controller 240, to verify the speech intention predicted by the first speech intention predictor 222.

Figure 3:
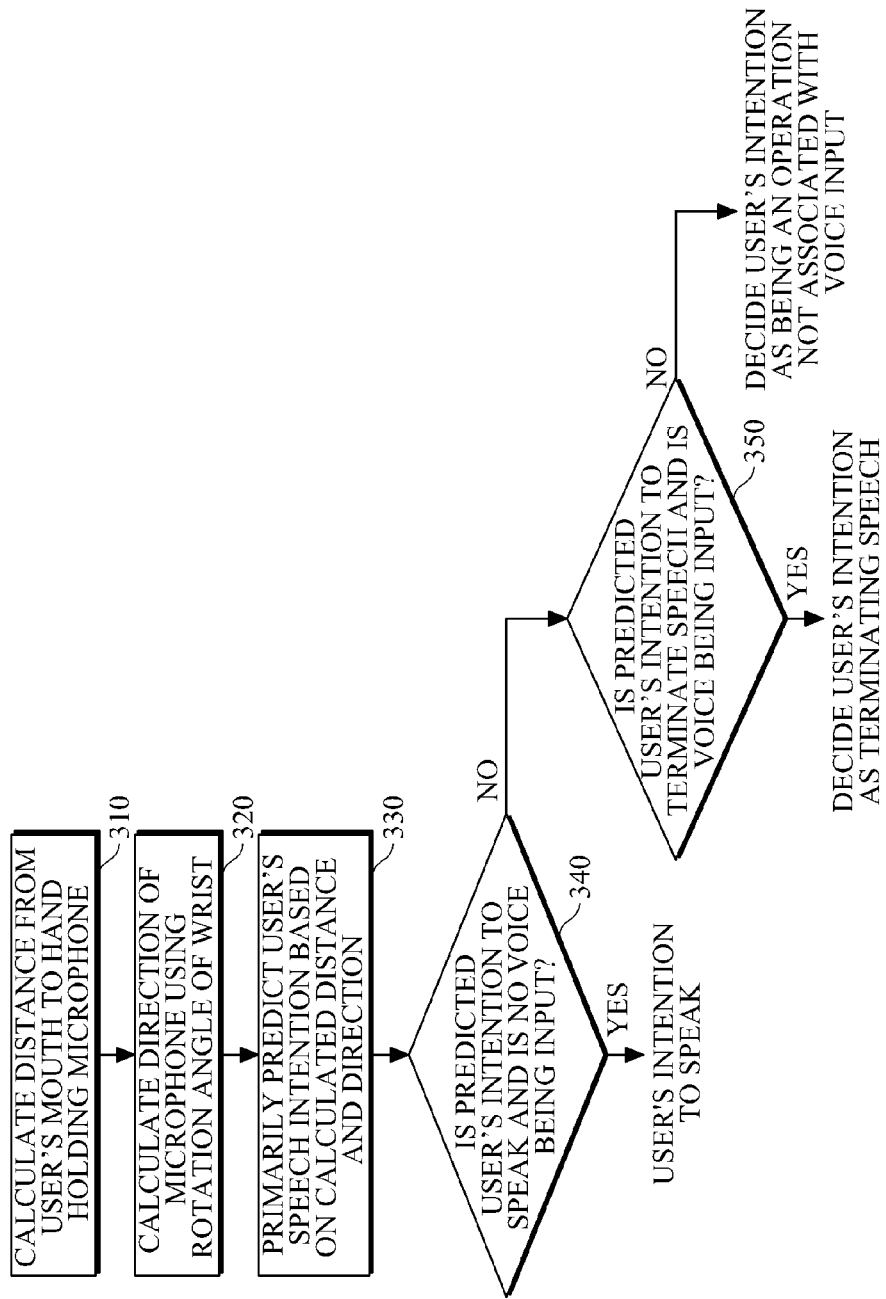
FIG. 3 is a flowchart illustrating an example of an operation that is performed by the speech intention determining unit of FIG. 2.

FIG. 3 is a flowchart illustrating an example of an operation that is performed by the speech intention determining unit of FIG. 2.

The motion information analyzer 210 may calculate a distance between the user's mouth and hand holding a microphone, using motion information sensed by motion capture sensors attached on the user's head and wrist (operation 310). The motion information analyzer 210 may calculate a direction of the microphone based on a rotation angle of the user's wrist (operation 320). The first speech intention predictor 222 may predict the user's speech intention, for example, whether the user tries to hold the microphone to the mouth or to take it away from the mouth, using the distance and direction information, and may primarily predict whether the user intends to speak (operation 330). For example, if the user's hand is within 20 cm from the user's mouth and the microphone faces the user's mouth, the first speech intention predictor 222 may determine that the user intends to speak.

The second speech intention predictor 224 may receive information indicating whether voice is detected by a voice detector of the user's intention applying unit 142 from a voice signal received from the sound sensor 130, and may determine whether or not voice is being input.

If it is determined that the predicted speech intention is to speak and no voice is input, the second speech intention predictor 224 may determine that a secondarily predicted speech intention is to speak. In an example in which no voice detection occurs when the voice detection apparatus 100 begins to operate, no operation for determining whether or not voice is input may be needed.

Then, the second speech intention predictor 224 may determine the secondarily predicted speech user's intention is to terminate speech, if the primarily predicted speech intention is to terminate speech and voice from being input (operation 350). Otherwise, the second speech intention predictor 224 may determine the speech intention as an operation not associated with a voice input and may ignore the speech intention predicted by the first speech intention predictor 222.

Figure 4:
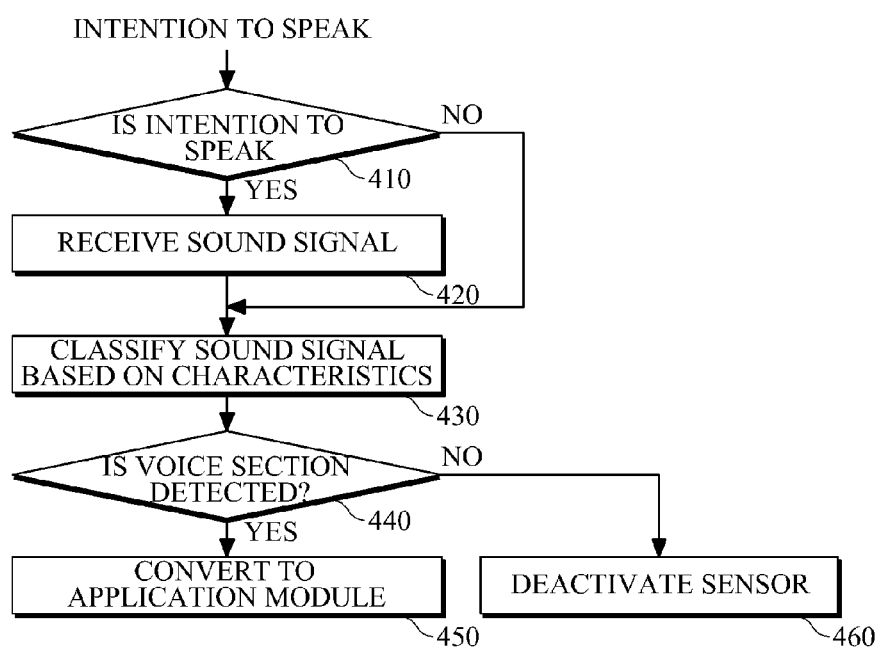
FIG. 4 is a flowchart illustrating an example of an operation of a controller according to a speech intention determined by the voice detection apparatus of FIG. 1.

FIG. 4 is a flowchart illustrating an example of an operation of the controller 140 according to a speech intention determined by the voice detection apparatus 100 of FIG. 1.

Referring to FIGS. 1 and 4, if information about a speech intention received from the speech intention determining unit 120 indicates an intention to speak (operation 410), the controller 140 may activate the sound sensor 130 and receive a sound signal (operation 420).

The voice detection unit 142 of the controller 140 may extract and analyze the characteristics of the received sound signal, classifying the characteristics of the sound signal to detect a voice section from the sound signal based on the analyzed results of the characteristics (operation 430).

For example, time domain characteristics (e.g., time energy, frequency energy, zero crossing rate, linear predictive coding (LPC), cepstral coefficients, pitch, etc.), and/or statistical characteristics (e.g., frequency spectrum) may be extracted from a sound signal received from a microphone. Extractable characteristics may be not limited to these examples and any other characteristics may be extracted by different algorithms. The extracted characteristics may be is classified into a speech class or a non-speech class using a classification and learning algorithm, such as a decision tree, a support vector machine, a Bayesian Network, a neural network, etc. However, the extracted characteristics may be not limited to these examples.

According to an embodiment, in an example in which a user's speech intention is predicted based on the user's motion information and voice detection is controlled according to the results of the prediction, a user may input his or her voice intuitively without learning a specific voice input method, for example, pressing a button to input voice or touching a screen.

Also, if the predicted user's intention is to speak, the voice section detector 142 may detect a voice section, using the characteristic information extracted from a sound signal, together with at least one piece of image information received from the image sensor 151 and sensed information received from the bio information sensor 153, wherein the sensed information may be a change occurring when a person speaks. Then, the voice section detector 142 may process speech of the detected voice section. For example, the sensed information may be at least one piece among image information representing a change in the user's mouth shape, temperature information representing a change in temperature due to breath, etc., emitted when speaking; vibration information representing throat vibration, jaw vibration, etc., occurring when speaking; and sensed information of infrared ray irradiated from the user's face or mouth when speaking.

If a voice section is detected in operation 440, the voice section detector 142 may process a voice signal belonging to the detected voice section and may perform voice recognition, and may convert an application module using the result of the voice recognition (operation 450). For example, if an application is executed according to the result of the voice recognition and a name is identified, intelligent voice input start or termination conversion, such as searching for a telephone number corresponding to the identified name or making a call with the found telephone number, may be allowed. Also, if the voice detection apparatus 100 is a mobile communication device, by perceiving an intention to start or terminate a voice call based on multimodal information, mode conversion into a voice call mode can be performed without having to perform operation such as pressing a call button.

If no voice section is detected in operation 440, modules, such as the sound sensor 430 and the multimodal sensor 150, to input sound signals and detect voice sections may be deactivated (operation 460).

If the speech intention received from the speech intention determining unit 120 is to terminate speech (410), the controller 140 may classify a sound signal received from the sound sensor 130 already activated based on the characteristics of the sound signal (operation 430), and may determine whether a voice section is detected (operation 440). If a voice section is detected like when the speech intention is to speak, an application module may be converted using the result of the voice recognition (operation 450) and if no voice section is detected, the sensor modules may be deactivated (operation 460).

Figure 5:
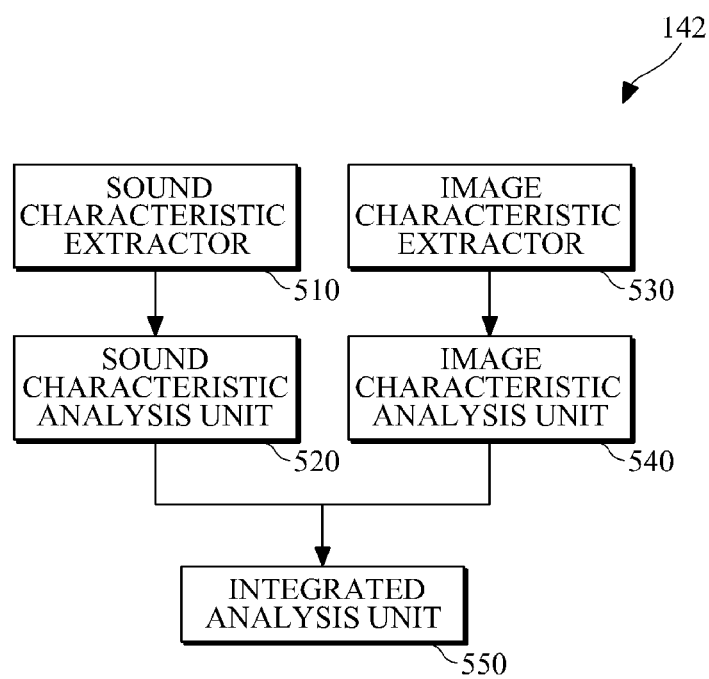
FIG. 5 is a diagram illustrating an example of a voice section detector of FIG. 1.

FIG. 5 is a diagram illustrating an example of the voice section detector 142 of FIG. 1.

The voice section detector 142 may include a sound characteristic extractor 510, a sound characteristic analysis unit 520, an image characteristic extractor 530, an image characteristic analysis unit 540, and an integrated analysis unit 550.

The sound characteristic extractor 510 may extract sound characteristics from a sound signal. The sound characteristic analysis unit 520 may extract a voice section by applying a classification and learning algorithm to sound characteristics. The image characteristic extractor 530 may extract image characteristics from a series of image signals. The image characteristic extractor 540 may extract a voice section by applying a classification and learning algorithm to the extracted image characteristics.

The integrated analysis unit 550 may integrate results classified respectively from the sound signals and image signals, finally detecting a voice section. For example, may be is possible to individually apply sound characteristics and image characteristics or to apply both characteristics after integrating them, and if the characteristics of other signals, for example, signals representing vibration, temperature, etc., may be extracted and analyzed, the integrated analysis unit 550 may integrate the analyzed characteristics with the information extracted from the sound signal and image signal, detecting a voice section.

According to an example embodiment, a user can input his or her voice intuitively without having to learn a voice input method for using a voice interface. For example, a user may not need to perform operations, such as pressing a button to input voice, touching a screen, etc. Also, it may be possible to accurately detect a user's voice in various noise environments regardless of the types or degrees of noise, including home noise, vehicle noise, and noise of other people. Furthermore, since voice can be detected using bio information as well as image information, a user's voice may be accurately detected even under too bright or dark lighting or even when the user covers his or her mouth with hands.

Figure 6:
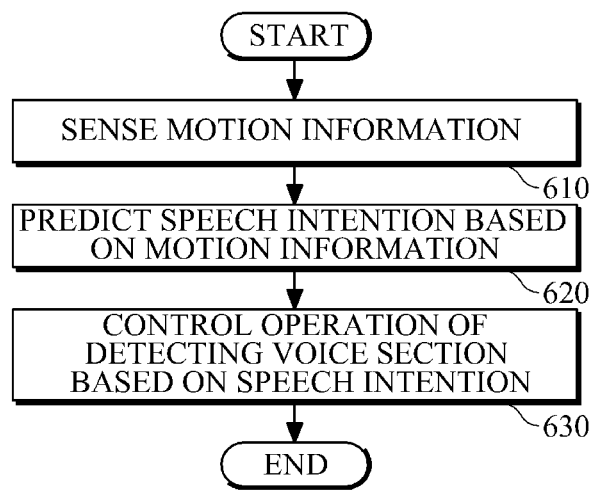
FIG. 6 is a flowchart illustrating an example of a voice detection method using motion information.

FIG. 6 is a flowchart illustrating an example of a voice detection method using motion information.

Referring to FIGS. 1 and 6, the voice detection apparatus 100 may receive motion information sensed by at least one motion capture sensor (operation 610).

The voice detection apparatus 100 may predict a speech intention regarding speech using the sensed motion information (operation 620). In order to predict the speech intention, the voice detection apparatus 100 may predict the location and angle of a human model based on the motion information, and may predict the speech intention using the predicted location and angle. Also, the voice detection apparatus 100 may verify the predicted speech intention by additionally receiving information on whether voice is being input.

The voice detection apparatus 100 may control operation of detecting a voice section based on the predicted speech intention (operation 630). If the speech intention is to speak, the is voice detection apparatus 100 may detect a voice section, using sensed information about a change occurring when a person speaks, which is sensed by a bio information sensor, along with using the processed result of characteristic information extracted from a sound signal. Then, the voice detection apparatus 100 may process voice included in the voice section.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of example embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A voice detection apparatus, comprising:
    a speech intention determining processor configured to:
        calculate a distance between a mouth of a user and a hand of the user holding a microphone based on motion information sensed by motion capture sensors placed on a head of the user and a wrist of the user,
        calculate a direction of the microphone based on a rotation angle sensed by the motion capture sensor placed on the wrist, and
        predict a speech intention regarding a speech of the user based on the distance and the direction; and
    a controller configured to control operation of detecting a voice section from a received sound signal based on the predicted speech intention.

2. The voice detection apparatus of claim 1, wherein the speech intention determining processor is further configured to determine whether the speech intention is to speak or to terminate speech based on the motion information.

3. The voice detection apparatus of claim 2, wherein the speech intention determining processor is further configured to receive, from the controller, information indicating whether voice is being input, to verify the predicted speech intention.

4. The voice detection apparatus of claim 3, wherein:
    in response to the predicted speech intention being to speak and no voice being input, the speech intention determining processor is further configured to determine that a secondarily predicted speech intention is to speak;
    in response to the predicted speech intention being to terminate speech and voice being input, the speech intention determining processor is further configured to determine that a secondarily predicted speech intention is to terminate speech; and
    otherwise, the speech intention determining processor is further configured to decide the secondarily predicted speech intention as being not associated with voice input.

5. The voice detection apparatus of claim 2, wherein, in response to the predicted speech intention being to speak, the controller is further configured to:
    activate a sound sensor;
    analyze the sound signal received from the activated sound sensor;
    detect the voice section from the sound signal; and
    recognize a voice of the voice section.

6. The voice detection apparatus of claim 2, wherein, in response to the predicted speech intention being to terminate speech, the controller is further configured to:
    analyze the sound signal already received from an activated sound sensor; and
    determine whether the voice section is detected from the sound signal.

7. The voice detection apparatus of claim 1, further comprising:
    a multimodal sensor configured to sense sensed information changed when a person speaks,
    wherein the controller is further configured to detect the voice section from the received sound signal based on the sensed information sensed by the multimodal sensor.

8. The voice detection apparatus of claim 7, wherein the sensed information comprises image information, or temperature information, or vibration information, or any combination thereof.

9. A voice detection method, comprising:
    calculating, by a processor, a distance between a mouth of a user and a hand of the user holding a microphone based on motion information sensed by motion capture sensors placed on a head of the user and a wrist of the user;
    calculating a direction of the microphone based on a rotation angle sensed by the motion capture sensor placed on the wrist;
    predicting a speech intention regarding a speech of the user based on the distance and the direction; and
    controlling operation of detecting a voice section based on the predicted speech intention.

10. The voice detection method of claim 9, wherein the predicting of the speech intention comprises determining whether the predicted speech intention is to speak or an intention to terminate speech based on the sensed motion information.

11. The voice detection method of claim 10, wherein the predicting of the speech intention comprises receiving information on whether voice is being input, to verify the predicted speech intention.

12. The voice detection method of claim 11, wherein the predicting of the speech intention comprises:

in response to the predicted speech intention being to speak and no voice being input, determining that a secondarily predicted speech intention is to speak;

in response to the predicted speech intention being to terminate speech and voice being input, determining that the secondarily predicted speech intention is to terminate speech; and otherwise, deciding the secondarily predicted speech intention as being not associated with voice input.

13. The voice detection method of claim 10, further comprising, in response to the predicted speech intention being to speak:

detecting the voice section from a received sound signal;

recognizing a voice of the voice section; and executing an application module based on the voice.

14. The voice detection method of claim 10, further comprising, in response to the predicted speech intention being to terminate speech:

analyzing a sound signal already received from an activated sound sensor; and determining whether the voice section is detected from the sound signal.

15. The voice detection method of claim 9, further comprising:

detecting the voice section based on sound characteristic information extracted from a received sound signal, and sensed information changed when a person speaks.

16. The voice detection method of claim 15, wherein the sensed information comprises image information, or temperature information, or vibration information, or any combination thereof.

17. The voice detection apparatus of claim 5, wherein the controller is further configured to deactivate the sound sensor in response to no voice section being detected.

18. The voice detection apparatus of claim 7, wherein the sensed information comprises temperature information.

19. The voice detection apparatus of claim 7, wherein the sensed information comprises information of an infrared ray irradiated from a face of the user, or the mouth of the user, when speaking.

* * * * *